(12) United States Patent
Moses et al.

(10) Patent No.: US 6,561,485 B1
(45) Date of Patent: May 13, 2003

(54) TANK SAFETY VALVE

(75) Inventors: Erhard Moses, Einbeck-Salzderhelden (DE); Torsten Wallbaum, Duingen (DE)

(73) Assignee: Kayser Automotive Systems GmbH, Einbeck ( * ) Notice: Subject to any disclaimer, the term of this patent is extended or adjusted under 35 U.S.C. 154(b) by 0 days.

(21) Appl. No.: 09/701,815

(22) PCT Filed: Jul. 2, 1999

(86) PCT No.: PCT/EP99/03855

§ 371 (c)(1),
(2), (4) Date: Jan. 30, 2001

(87) PCT Pub. No.: WO99/63255

PCT Pub. Date: Dec. 9, 1999

(30) Foreign Application Priority Data

Jun. 3, 1998 (DE) .......................................... 198 24 791

(51) Int. Cl.[7] ................................................. F16K 5/00
(52) U.S. Cl. ..................................................... 251/331
(58) Field of Search ......................................... 251/331

(56) References Cited

U.S. PATENT DOCUMENTS 4,828,219 A * 5/1989 Ohmi et al. ................. 251/118
4,846,440 A * 7/1989 Carlson et al. ................ 138/44
5,680,848 A   10/1997 Katoh et al. ................. 125/518
5,730,423 A    3/1998 Wu et al. ..................... 251/331
5,755,428 A * 5/1998 Ollivier ....................... 251/331
5,762,086 A * 6/1998 Ollivier ......................... 137/1
5,820,105 A * 10/1998 Yamaji et al. ............... 251/331
5,851,004 A * 12/1998 Wu et al. ..................... 251/331

FOREIGN PATENT DOCUMENTS

DE            0275427       12/1987 ..................... 88/30

* cited by examiner

*Primary Examiner*—Gene Mancene
*Assistant Examiner*—John Fristoe
(74) *Attorney, Agent, or Firm*—Brouse McDowell; Roger D. Emerson; Timothy D. Bennett

(57) ABSTRACT

A fuel tank protection valve is provided. The valve consists an all-metal diaphragm suitable for operating at low temperatures. The valve includes a tank duct connected to the fuel tank and a second duct connected to a filter. A sealing device is connected to the diaphragm adapted to open and close a passage between the tank duct and the second duct. The valve further includes a one-way, mushroom type valve to allow gas flow from the filter to the gas tank. A clamp cover with air passage openings is included to allow equalization of the pressure between the ambient air and the air pressure within the cover space.

10 Claims, 2 Drawing Sheets

TANK SAFETY VALVE

The invention relates to a valve, in particular for admitting air into a motor-vehicle tank and extracting air from the same, as is described in claim 1.

BACKGROUND OF THE INVENTION

Valves for extracting air from a fuel tank and admitting air into the same are known in the prior art. The operation of extracting air from a fuel tank and admitting air into the same has to be ensured during refuelling, operation and the standstill phase. Such valves are usually arranged between the fuel tank and the activated carbon filter (ACF). During refuelling, on account of the fuel fed and of a suction-jet-pump effect, a positive pressure is produced in the fuel tank, and this is fed to the ACF via the valve in order to ensure emission-free refuelling (onboard refuelling vapour recovery/ORVR). Moreover, the fuel vapours produced have to be fed to the ACF both when the vehicle is at a standstill and when it is travelling. When the vehicle is travelling, during the scavenging phases, the fuel vapours are taken by suction into the gas-feed stream of the internal combustion engine from the ACF, the valve protecting the fuel tank against a negative pressure being applied to the filter.

An opening and closing movement of such a valve or tank safety valve is usually made possible by a flexible elastomeric diaphragm arranged in the valve. Said elastomeric diaphragms have disadvantageous properties in respect of their permeability for hydrocarbon gases and a disadvantageous sensitivity to temperature. In particular with low temperatures, the flexibility or elasticity of elastomeric diaphragms with the necessary permeability is so low that this may result in the valve functioning inadequately or failing altogether. In view of the increasingly stringent limit values for hydrocarbon emissions for motor vehicles, in particular in the USA, there is thus a need for a valve which, even at low temperatures down to −40° C., has satisfactory valve functioning and permeability properties.

BRIEF SUMMARY OF THE INVENTION

The object of the invention is to provide a valve having the necessary permeation and temperature properties.

The object is achieved by a valve having the features specified in claim 1. Advantageous embodiments form the subject matter of the subclaims.

A valve according to the invention, in particular for extracting air from a fuel tank and admitting air into the same, has a tank duct leading to the tank and a second duct leading away from the tank, in particular leading to a filter or activated carbon filter, having a diaphragm for executing an opening or closing movement for respectively opening or sealing a through-passage from the tank duct to the second duct, the diaphragm consisting of metal, in particular of a metal foil. Surprisingly, a metal diaphragm advantageously has a low permeability for hydrocarbon gases which are contained in fuel vapours. In addition, the metal diaphragm according to the invention has an advantageous low temperature dependency in respect of its mechanical properties, in particular of its flexibility, elasticity and permeability for gases. As a result, the dependency of the functional values of the valve and of the permeation of gases on the temperature can be minimized and preferably eliminated.

Basically all metals which can be rolled out as a foil and/or sufficiently thinly are suitable for the diaphragm. High-grade steel and copper/beryllium have proven particularly preferred as materials for the diaphragm.

According to a preferred embodiment, the diaphragm has a thickness in a range of from 20 $\mu$m to 40 $\mu$m. In this thickness range, the diaphragm has a sufficiently low permeability along with advantageous mechanical properties, in particular high elasticity and flexibility.

According to a further preferred embodiment of the invention, the valve comprises an additional sealing device for sealing and/or closing the through-passage between the tank duct and the second duct. The sealing device is arranged on the diaphragm.

The sealing device preferably consists of an elastomeric material which allows a good sealing action. The sealing device here need not have a low permeability in relation to hydrocarbon gases since the sealing function in relation to the surroundings is provided by the diaphragm. The sealing device is preferably secured, for example adhesively bonded or vulcanized, in the centre of the diaphragm.

According to a further preferred embodiment of the invention, the tank duct and the second duct are connected to one another in addition by a one-way valve, which opens when the gas pressure in the second duct is higher than the gas pressure in the tank duct. This allows gas from the filter, in particular in the form of an activated carbon filter, to be admitted into the fuel tank.

The one-way valve is preferably designed as an umbrella-type mushroom valve.

According to a further preferred embodiment, the diaphragm is designed such that, for the opening and closing movements, it allows an expansion by a predetermined distance., This allows a larger opening displacement of the diaphragm and thus a larger free opening cross section of the through-passage.

At least part of the diaphragm may advantageously be designed with corrugations which run essentially perpendicularly to the expansion direction. Such corrugations can be pressed into the diaphragm or the diaphragm foil by a moulding step and allow a considerably larger displacement of the diaphragm.

According to a further preferred embodiment, the diaphragm is of circular design and, on its outer circumference, is retained in a gas-tight manner by way of a sealing ring on at least one sealing surface of a valve housing. The sealing ring here may be pressed onto the valve housing by a clamping cover such that it positions the diaphragm against the sealing surfaces in a gas-tight manner.

The invention is described by way of example hereinbelow with reference to a preferred embodiment, in which:

DETAILED DESCRIPTION OF THE INVENTION

Figure 1:
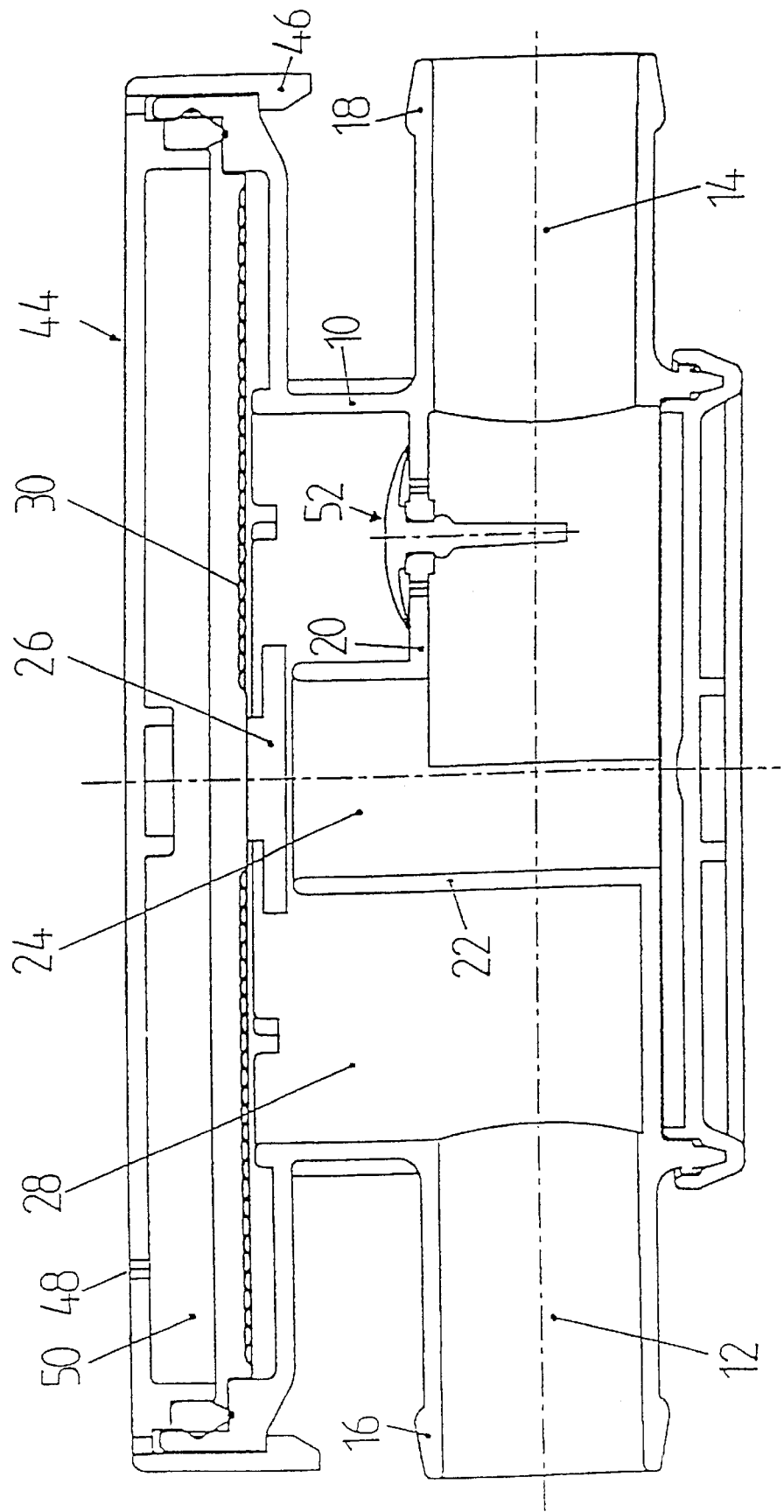
FIG. 1 shows a cross section of a valve according to the invention.

FIG. 1 illustrates a cross section of a valve according to the invention. A tank duct 12 and a second duct 14 are arranged, in the form of two connection stubs 16, 18, on opposite sides of an essentially tubular valve housing 10. The tank duct 12 is connected for gas flow to a fuel tank (not illustrated) and the second duct 14 is connected for gas flow to an activated carbon filter (not illustrated). The connection stub 18 of the second duct 14 is connected along its longitudinal axis to a tubular connecting duct 20, which opens out into an open valve stub 22 extending into the interior of the valve. The connecting duct 20 and valve stub 22 form an L-shaped through-passage 24, which is connected for gas flow to the second duct 14. At its top end, as seen in the longitudinal direction, the valve stub can be sealed by a sealing device 26 in relation to a valve space 28 which encloses the valve stub. The sealing device 26 preferably consists of an elastomeric material which, in abutment with the top end of the valve stub 22, allows a gas-tight termination of the through-passage 24 in relation to the valve space 28. On the side which is located opposite the valve stub 22, the sealing device 26 is adhesively bonded or vulcanized to a flexible or elastic diaphragm 30. The essentially circular diaphragm 30 consists of a metal foil, in the embodiment illustrated of high-grade steel or cooper/beryllium. The thickness of the diaphragm 30 is approximately 30 μm.

Figure 2:
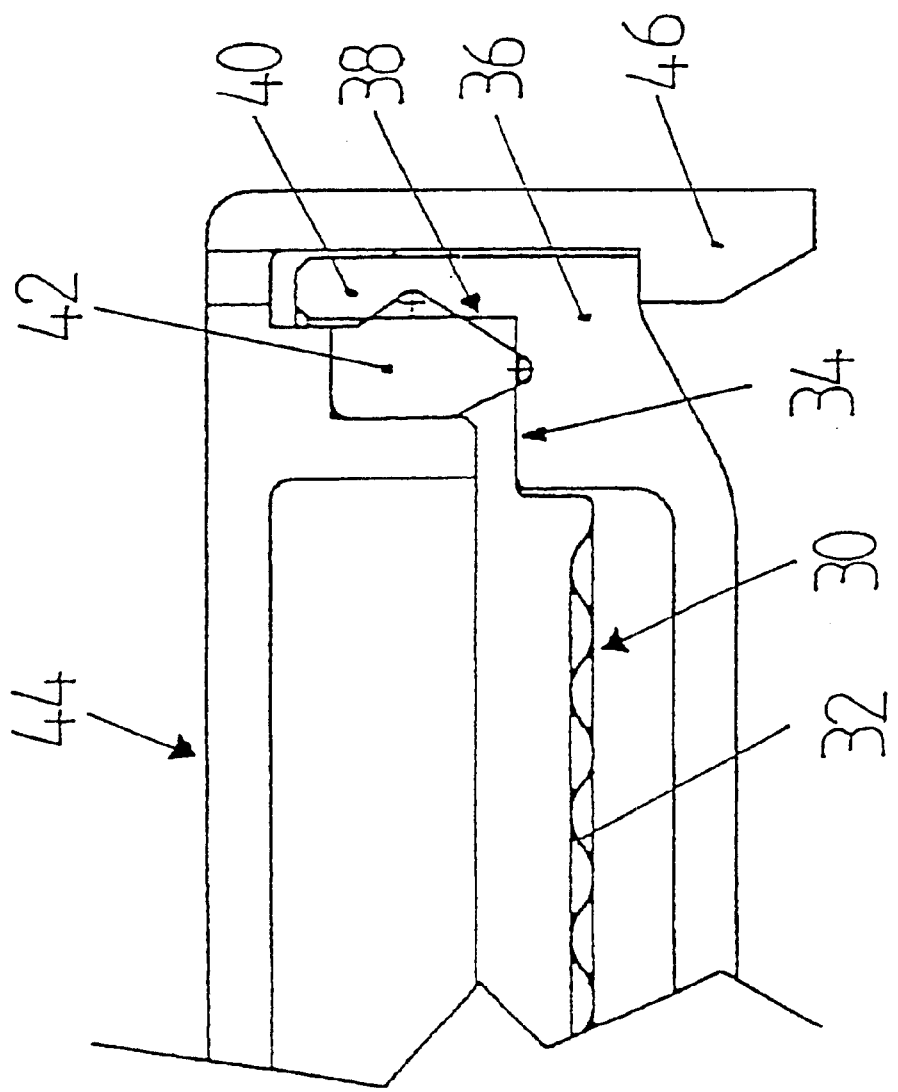
FIG. 2 shows a cross section of a detail of a valve according to the invention, which shows the attachment of the diaphragm to a housing.

The attachment of the diaphragm 30 to the valve housing 10 is illustrated on an enlarged scale in FIG. 2. In order to allow a large valve displacement of the sealing device 26, the diaphragm 30 is designed, by way of a moulding step, with radially concentric corrugations 32, which thus extend essentially perpendicularly to the expansion direction of the diaphragm 30. On its circumferential border the diaphragm 30 is positioned against a first sealing surface 34 of a carrier part 36 of the valve housing 10, said sealing surface extending in radial directions of the diaphragm 30. A second sealing surface 38, which forms an inner cylinder wall, is formed in an axially extending, tubular protrusion 40 of the carrier part 36 such that the diaphragm 30 can also be positioned against the second sealing surface 38. The diaphragm 30 is retained with sealing action by way of a sealing ring 42, which in this embodiment consists of rubber, on the first and second sealing surfaces 34, 38 via a clamping cover 44. In the figures, the sealing ring 42 is illustrated with an overlap, i.e. as being undeformed. The sealing stressing is obtained as a result of this overlap. The clamping cover 44 is connected to the valve housing 10 by a clamp part 46, it being possible for the clamp part 46 to be latched to the carrier part 36. The clamping cover 44 contains air through-passage openings 48, which serve for equalizing the pressure between the ambient air pressure and an air pressure in a cover space 50 extending between the diaphragm 30 and clamping cover 44.

A one-way valve in the form of an umbrella-type mushroom valve 52 is arranged in the connecting part 20 such that it opens when the gas pressure in the second duct 14 is higher than in the tank duct 12. The open umbrella-type mushroom valve 52 provides a gas flow connection between the second duct 14 and tank duct 12.

A gas pressure in the tank duct, which is higher than the air pressure in the cover space, results in an opening movement of the sealing device 26 connected to the diaphragm 30, i.e. in a movement away from the valve stub 22 in the axial direction of the diaphragm. This means that gases can flow from the tank duct 12, through the through-passage 24, into the second duct 14. If a negative pressure in relation to the tank duct 12 prevails in the second duct 14, then the sealing device 26 closes onto the valve stub 22 in a gas-tight manner, and the umbrella-type mushroom valve 52 also closes. A negative pressure in the tank duct 12 in relation to the cover space 50 and the second duct 14 results in the umbrella-type mushroom valve opening and thus in air being admitted into the fuel tank.

LIST OF DESIGNATIONS

10. Valve housing
12. Tank duct
14. Second duct
16. First connection stub
18. Second connection stub
20. Connecting duct
22. Valve stub
24. Through-passage
26. Sealing device
28. Valve space
30. Diaphragm
32. Corrugations
34. First sealing surface
36. Carrier part
38. Second sealing surface
40. Protrusion
42. Sealing ring
44. Clamping cover
46. Clamp part
48. Air through-passage openings
50. Cover space
52. Umbrella-type mushroom valve

What is claimed is:

1. A fuel tank valve adapted to admit and extract air into and out of a fuel tank comprising:
    a tank duct;
    a second duct;
    a diaphragm adapted to facilitate the opening and closing of a passage connecting the tank and second duct, wherein the diaphragm is capable of maintaining its elasticity and permeability at temperatures as low as minus 40 degrees Celsius, wherein the diaphragm is made of metal foil, the metal foil having a thickness ranging from 20 μm to 40 μm; and,
    a one-way valve connecting the tank and second duct.

2. The fuel tank valve of claim 1 wherein the diaphragm is made of a high-grade steel or copper-beryllium.

3. The fuel tank valve of claim 1 wherein the one-way valve is an umbrella, mushroom type valve.

4. A fuel tank valve adapted to admit and extract air into a fuel tank comprising:
    a tank duct;
    a second duct;
    a diaphragm adapted to facilitate the opening and closing of a passage connecting the tank and second duct, wherein the diaphragm is capable of maintaining its elasticity and permeability at temperatures as low as minus 40 degrees Celsius, wherein the diaphragm is made of metal foil, the metal foil having a thickness ranging from 20 μm to 40 μm;
    a sealing device adapted to facilitate the opening and closing of a passage connecting the tank and second duct; and,
    a one-way valve connecting the tank and second duct.

5. The fuel tank valve of claim 4 further comprising;
    a sealing ring adapted to retain the diaphragm.

6. The fuel tank valve of claim 5 further comprising;
    a clamping cover adapted to retain the sealing ring.

7. The fuel tank valve of claim 6 wherein the clamping cover has openings to allow for the equalizing of air pressure between the ambient air and the air pressure in the cover space.

8. The fuel tank valve of claim 4 wherein the sealing device is connected to a diaphragm.

9. The fuel tank valve of claim 8 wherein the sealing device is made of an elastomeric material and is vulcanized or adhesively bonded to the diaphragm.

10. The fuel tank valve of claim 9 wherein the diaphragm includes radially concentric corrugations that extends perpendicular to the direction of expansion of the diaphragm.

* * * * *